Patented Sept. 20, 1932

1,877,945

UNITED STATES PATENT OFFICE

PAUL NAWIASKY, OF LUDWIGSHAFEN-ON-THE-RHINE, GERMANY, ASSIGNOR TO GENERAL ANILINE WORKS, INC., OF NEW YORK, N. Y., A CORPORATION OF DELAWARE

DYEING WITH VAT DYESTUFFS SENSITIVE TO CALCIUM COMPOUNDS

No Drawing. Application filed July 9, 1928, Serial No. 291,496, and in Germany July 19, 1927.

A considerable number of vat dyestuffs have the undesirable property of separating out, in the form of the alkaline earth metal salts of their hydrocompounds, when employed for dyeing in the presence of compounds of alkaline earth metals, as for example when hard water is used, the result being that the dyeings are substantially weaker than is the case with water which is free from calcium.

I have now found that this drawback is obviated, in a practially complete manner by adding phosphoric acid or water-soluble salts of the same to the vat dyestuffs themselves or to the bath liquor. The amounts of phosphoric acid or its salts to be added depend on the calcium content of the dyebath and such amounts as are capable of binding the calcium ions in the dyebath are sufficient. When preparing compositions of matter comprising vat dyestuffs sensitive to the action of calcium compounds which may be used in dye baths containing calcium salts rather large quantities of phosphoric acid or a water-soluble salt thereof, for instance the same amount by weight as that of the dyestuff employed, are incorporated with the vat dyestuff. It has been found that the action of phosphoric acid is substantially superior to that of other acids which form sparingly soluble alkaline earth metal salts, especially calcium salts, such as carbonic acid and oxalic acid. In practice, this is important in all cases where water of condensation is not available for dyeing, especially when it is a matter of dyeing with mixtures of several dyestuffs, which differ in respect of their sensitiveness to calcium compounds.

The following examples will further illustrate the nature of the said invention which however is not limited thereto. The parts are by weight.

*Example 1*

9 parts of an 11 per cent paste of brominated pyranthrone (see Schultz "Farbstoff-Tabellen," 5th Ed., p. 61, No. 762) are mixed with 1 part of diammonium phosphate, and stirred until the salt is dissolved. A dyestuff paste is obtained which is practically insensitive to calcium compounds in dyeing from the vat.

*Example 2*

5 parts of the trichloranthraquinone-dihydroazine obtainable by the chlorination of dihydroanthraquinoneazine and subsequent treatment with alkaline hydrosulphite solution probably corresponding to the formula:

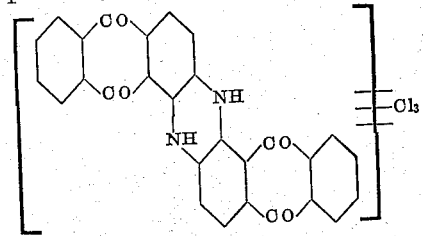

are mixed, in a finely powdered state with 5 parts of disodium phosphate. The resulting powder is practically insensitive to calcium compounds in dyeing from the vat.

A similar procedure is adopted when a charge is prepared from the said dyestuff and a yellow dyestuff insensitive to calcium compounds, for example, the anthraquinone-diphenyl-dithiazol from 2.6-diaminoanthraquinone (see U. S. Patent No. 1,095,731, Example 3). The dyeings obtained in this case are of the same greenish tinge whether the water used contains calcium or not, whereas, in the absence of the added phosphate, a more yellowish tinge is obtained with water containing calcium.

What I claim is:—

1. A composition of matter comprising a vat dyestuff sensitive, in dyeing, to the action of calcium compounds and a compound selected from the group consisting of phosphoric acid and its water-soluble salts.

2. A composition of matter comprising a vat dyestuff sensitive, in dyeing, to the action of calcium compounds and about the same amount by weight of a compound selected from the group consisting of phosphoric acid and its water-soluble salts.

3. A composition of matter comprising a vat dyestuff sensitive, in dyeing, to the action of calcium compounds and the same amount by weight of diammonium phosphate.

In testimony whereof I have hereunto set my hand.

PAUL NAWIASKY.